June 18, 1963     N. J. HVISTENDAHL     3,094,253
MEASURING DISPENSER ATTACHABLE TO RECEPTACLES
Filed Oct. 31, 1960     2 Sheets-Sheet 1
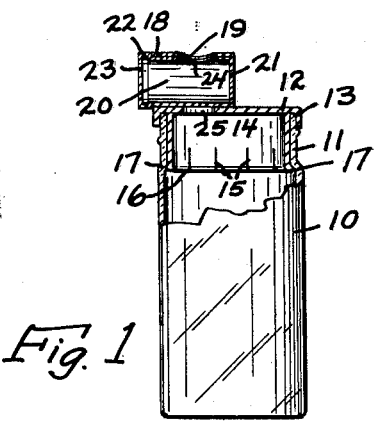
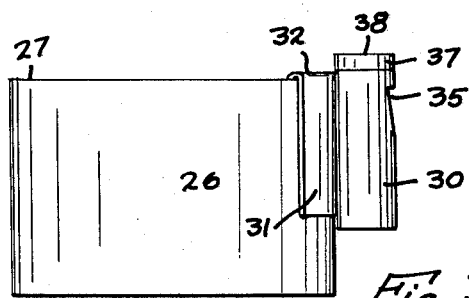
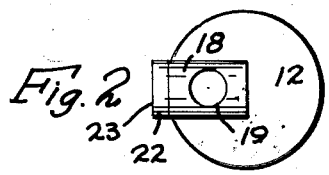
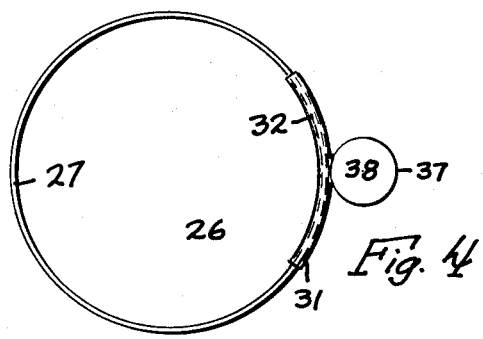
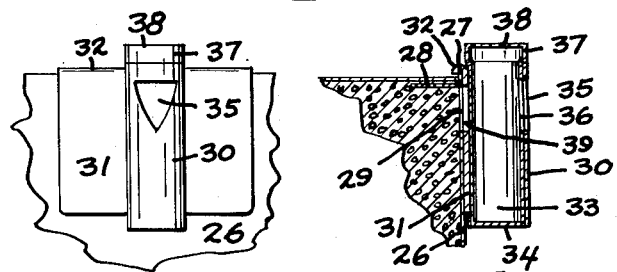
INVENTOR.
Nels J. Hvistendahl
BY
*Sam J. Slotsky*
ATTORNEY June 18, 1963 N. J. HVISTENDAHL 3,094,253
MEASURING DISPENSER ATTACHABLE TO RECEPTACLES
Filed Oct. 31, 1960 2 Sheets-Sheet 2

INVENTOR.
Nels J. Hvistendahl
BY
ATTORNEY

United States Patent Office 3,094,253
Patented June 18, 1963

3,094,253
MEASURING DISPENSER ATTACHABLE
TO RECEPTACLES
Nels J. Hvistendahl, 1324 S. Mulberry, Sioux City, Iowa
Filed Oct. 31, 1960, Ser. No. 66,244
1 Claim. (Cl. 222—452)

My invention relates to a dispenser.

An object of my invention is to provide a dispenser which will dispense material such as coffee and the like in pre-regulated amounts.

A further object of my invention is to provide a dispenser which can be readily attached to a glass container of the type holding instant coffee and the like.

A further object of my invention is to provide a modified form of dispenser which can be readily attached to a coffee can or the like, and whereby it will not be necessary to open the coffee can lid, the dispenser including features for being attached to the coffee can in a simple manner and requiring only punching out of a portion of the said coffee can.

A further object of my invention is to provide simple and convenient means for attaching the dispenser to the coffee can.

Figure 7:
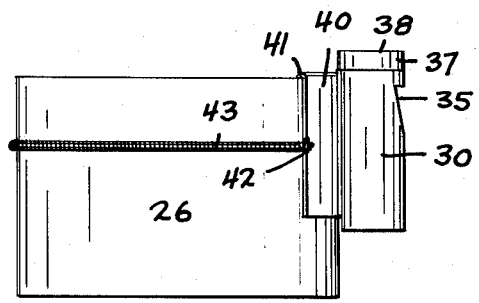
Figure 8:
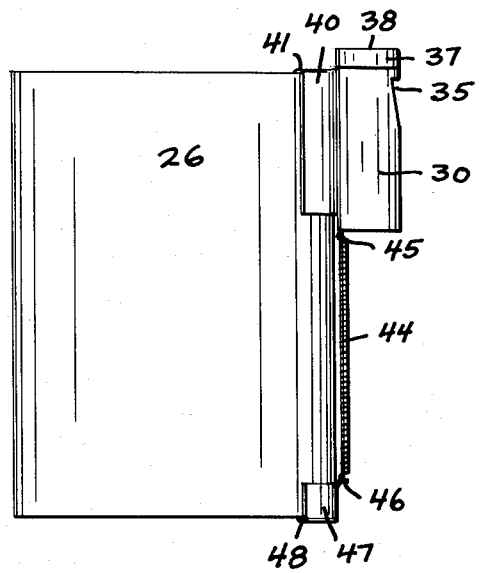

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is a side elevation of the dispenser as applied to a small jar, taken partly in section, FIGURE 2 is a plan view of FIGURE 1, FIGURE 3 is a side elevation of a modification showing the dispenser as applied to a coffee can, FIGURE 4 is a plan view of FIGURE 3, FIGURE 5 is a sectional detail of the modification shown in FIGURE 3, FIGURE 6 is a forward view of a portion of FIGURE 3, FIGURE 7 is a side elevation showing a modification of the clamping arrangement, and FIGURE 8 is a further modification showing a modified clamping arrangement.

My invention contemplates the provision of a dispenser or dispensers which can be conveniently attached to containers which contain such commodities as coffee and the like, and whereby the dispensers will function cooperatively with the containers to provide dispensing of pre-regulated or pre-measured amounts of the material.

In FIGURE 1, I have used the character 10 to designate a jar of the usual type for containing instant coffee or the like, the jar 10 including the neck portion 11.

The dispenser of my invention comprises a cap member 12 which is preferably made of a suitable plastic having resilient qualities, and merging with the portion 12 is the annular portion 13 which is adapted to snugly receive the outer peripheral edge of the neck 11, and also merging with the top portion 12 is a cylindrical portion 14 which extends downwardly into the neck 11 and which includes the peripherally spaced longitudinally extending cuts 15 which provide means whereby the lower portions at 16 will resiliently spread beneath the slightly expanded portions 17 of the jar to thereby secure the dispensing unit in place.

Moulded integrally with the portion 12 is an outer cylindrical plastic member 18 having an opening at 19. Snugly engaging the inside of the member 18 is the further cylindrical member 20 having the closed end 21, and formed integrally with the member 20 is the cylindrical portion 22 having the end wall 23, the portion 22 providing means for rotating the inner cylindrical member 20.

The inner cylindrical member 20 includes a further opening 24, and formed in the member 12 is a further opening 25.

It will now be noted from the foregoing description that the unit comprising the portions 12, 13, 14, 18 and 20, etc. can be conveniently mounted onto the jar 10 after the usual cover is removed, and the inner portion 20 is provided of such size so as to contain one or two teaspoons of the material in the jar, or any other pre-regulated amount, so that the user of the arrangement will know that the proper quantity is being used without requiring teaspoons and the like.

The arrangement is used in the following manner. First, the opening 24 will be in the position adjacent to the opening 25, whereby by tipping the jar 10 over, the coffee or other material will enter into the inner member 20. Next, the member 20 is rotated by means of the end 22 until the openings 19 and 24 will register as shown in FIGURE 1, and whereby the opening 25 will then be closed. The material is then allowed to pour out through the openings 19 and 24 into the cup, etc., whereupon the pre-regulated and proper amount will be supplied in a convenient manner.

FIGURE 3 illustrates a modification wherein a coffee can 26 will be used with the modified form of dispenser and without requiring complete opening of the lid of the coffee can, the coffee can including the annular end flanges 27. In this modification the coffee can is first opened by means of a beer can opener, or similar tool, the character 28 indicating in FIGURE 5 the portion that is punched out, leaving the opening 29.

The dispensing unit comprises an outer cylindrical casing 30 which is securely attached by riveting or any other desired method to the arcuate plate 31, this arcuate plate being made of a highly magnetic material such as alnico or the like, the plate 31 including the bent-over end portion 32, which is adapted to receive a portion of the flange 27.

The cylindrical casing 30 is preferably made of plastic, and the character 33 indicates an inner cylindrical member having the bottom wall 34, the cylindrical member 33 being snugly received in the member 30, the character 35 indicating a substantially triangular, or other shaped, opening in the member 30, the character 36 indicating a further similar opening in the inner cylindrical member 33.

Extending from the member 30 is the integral cylindrical member 37 which acts as a rotating handle, and which includes the top wall 38.

The arcuate magnetic member 31 also includes a further opening 39 which is adapted to be positioned adjacently to the opening 29.

It will be obvious from the foregoing description that the magneic member 31 will be strongly held to the metal sides of the can 26 together with the bent-over portion 32. The punching device which is commonly used will thus provide an opening adjacent to the opening 39, thereby providing a convenient arrangement whereby the dispenser can be attached to the coffee can without opening the top of the coffee can, and thence not requiring transfer of the coffee in the can to jars or other receptacles.

The dispenser is used in a somewhat similar manner to that described in FIGURE 1, FIGURE 5 showing both openings 35 and 36 in position whereby the contents of the inner cylindrical member 33 can be emptied, and thereby emptying only the pre-determined required amount.

For emptying a portion of the coffee or other commodity into the receptacle 33, the member 33 is rotated by means of the upper portion 37 until the opening will register with the opening 29 in the can and the opening 39 in the manner 31, the can 26 being tipped so that the coffee or other product will then fall into the dispenser member 33, the dispenser member then being rotated to the position shown in FIGURE 5, so that in this way a preregulated amount can be readily poured into a percolator or the like without requiring teaspoons, etc.

FIGURES 7 and 8 illustrate further modifications wherein identical characters will indicate identical parts, and wherein the character 40 will indicate an arcuate plate, which plate, however, is not magnetic in character, this plate including a bent-over portion 41, and attached at 42 to one end of the plate 40 is a coiled helical spring 43 which passes around the can 26 and is suitably attached to the other end of the plate 40, this arrangement also providing a firm grasping means for the dispenser.

FIGURE 8 illustrates a somewhat similar construction, however, in this construction a lengthened coiled helical spring 44 is attached as at 45 to the dispenser unit, and is attached as at 46 to a further arcuate plate 47 having the bent-over portion 48 for grasping the lower annular flange of the coffee can, this arrangement also providing a firm attachment for the dispenser, and also providing means for coffee cans and the like of greater length and capacity, it being noted also that the spring 43 will accommodate cans of greater diameter than that shown.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A dispenser for attachment to a can comprising a substantially arcuate flange, said flange having an opening adapted to communicate with a punched opening in said can, an outer cylindrical casing attached to said substantially arcuate flange, said outer casing having an opening, an inner casing rotatable within said outer casing adapted to contain a pre-determined amount of material therein, said inner casing having an opening communicating with said outer casing opening, all of said openings being aligned whereby said flange opening can be closed when said outer casing opening and said inner casing opening are positioned adjacently to each other, means for securing said substantially arcuate flange to said can including an upper bent-over portion extending integrally from said substantially arcuate flange adapted to receive an annular raised flange of said can, means attachable between siad substantially arcuate flange and said can to secure said substantially arcuate flange to said can, said means including a helically wound spring positioned generally parallel to the axis of said can, one end of said spring being attached to said outer casing, a lower lug having a further bent-over portion adapted to engage a lower peripheral flange of said can, the other end of said spring being attached to said lug.

References Cited in the file of this patent

UNITED STATES PATENTS

| | | |
|---|---|---|
| 1,165,285 | Record | Dec. 21, 1915 |
| 1,298,031 | Fromhagen | Mar. 25, 1919 |
| 2,579,549 | Cave | Dec. 25, 1951 |
| 2,611,516 | Beldner | Sept. 23, 1952 |
| 2,761,717 | Mahlke | Sept. 4, 1956 |
| 2,795,357 | Burton et al. | June 11, 1957 |
| 2,846,126 | Warren | Aug. 5, 1958 |

FOREIGN PATENTS

| | | |
|---|---|---|
| 131,585 | Great Britain | Jan. 29, 1920 |